(12) United States Patent
Chin et al.

(10) Patent No.: US 9,479,991 B2
(45) Date of Patent: Oct. 25, 2016

(54) METHODS AND APPARATUS FOR UTILIZING TD-SCDMA IDLE INTERVALS IN TDD-LTE MEASUREMENT OPERATIONS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 366 days.

(21) Appl. No.: 13/979,832

(22) PCT Filed: Feb. 16, 2011

(86) PCT No.: PCT/US2011/025118
§ 371 (c)(1),
(2), (4) Date: Nov. 14, 2013

(87) PCT Pub. No.: WO2012/112152
PCT Pub. Date: Aug. 23, 2012

(65) Prior Publication Data
US 2014/0064122 A1 Mar. 6, 2014

(51) Int. Cl.
*H04W 36/30* (2009.01)
*H04W 76/04* (2009.01)
*H04W 36/14* (2009.01)

(52) U.S. Cl.
CPC ............ *H04W 36/30* (2013.01); *H04W 36/14* (2013.01); *H04W 76/048* (2013.01); *Y02B 60/50* (2013.01)

(58) Field of Classification Search
CPC . H04W 36/30; H04W 36/14; H04W 76/048; H04W 24/10; H04W 36/0088
See application file for complete search history.

(56) References Cited

U.S. PATENT DOCUMENTS

| | | | |
|---|---|---|---|
| 8,626,124 B2* | 1/2014 | Mallick | H04W 56/0015 370/338 |
| 2007/0032233 A1* | 2/2007 | Tajima | H04W 8/02 455/433 |
| 2008/0189970 A1* | 8/2008 | Wang | H04W 36/0055 33/701 |
| 2010/0034126 A1* | 2/2010 | Kitazoe | H04W 74/085 370/310 |
| 2010/0331019 A1 | 12/2010 | Bhattacharjee et al. | |
| 2011/0058529 A1* | 3/2011 | Uemura | H04W 36/0077 370/331 |
| 2012/0083278 A1* | 4/2012 | Kazmi | H04W 64/00 455/440 |

(Continued)

FOREIGN PATENT DOCUMENTS

| | | |
|---|---|---|
| CN | 101790896 A | 7/2010 |
| CN | 101795477 A | 8/2010 |
| CN | 101821965 A | 9/2010 |

(Continued)

OTHER PUBLICATIONS

International Search Report and Written Opinion—PCT/US2011/025118—ISA/EPO—Nov. 21, 2011.

(Continued)

*Primary Examiner* — Omer S Mian
(74) *Attorney, Agent, or Firm* — François A. Pelaez

(57) ABSTRACT

Methods and apparatus are provided for utilizing an idle interval of a first radio access network (RAN) for performing measurements in a second RAN. For certain aspects, the first and second RANs may be a Time Division—Synchronous Code Division Multiple Access (TD-SCDMA) network and a Time Division Duplex Long Term Evolution (TDD-LTE) network, respectively. With efficient use of the first RAN's idle interval, increased power savings or increased system throughput may be achieved.

32 Claims, 15 Drawing Sheets

(56) References Cited

U.S. PATENT DOCUMENTS

2012/0213142 A1* 8/2012 Van Lieshout ..... H04W 72/121
370/312
2013/0176997 A1* 7/2013 Tian ................. H04W 56/0085
370/336

FOREIGN PATENT DOCUMENTS

| EP | 2034628 A1 | 3/2009 |
| EP | 2124461 | 11/2009 |
| WO | 2009020109 A1 | 2/2009 |
| WO | 2010120837 | 10/2010 |

OTHER PUBLICATIONS

"LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)", Technical Specification, European Telecommunications Standards Institute (ETSI), 650, Route Des Luioles; F-06921 Sophia-Antipolis; France, vol. 3GPP Ran 2, No. V10.2.0, Jan. 1, 2011, XP014062136.

* cited by examiner

| Uplink-downlink configuration | Downlink-to-Uplink Switch-point periodicity | Subframe number ||||||||||
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

METHODS AND APPARATUS FOR UTILIZING TD-SCDMA IDLE INTERVALS IN TDD-LTE MEASUREMENT OPERATIONS

BACKGROUND

1. Field

Certain aspects of the present disclosure generally relate to wireless communications and, more particularly, to utilizing Time Division—Synchronous Code Division Multiple Access (TD-SCDMA) idle intervals to perform TDD-LTE (Time Division Duplex Long Term Evolution) measurements.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies, not only to meet the growing demand for mobile broadband access, but to advance and enhance the user experience with mobile communications.

SUMMARY

In an aspect of the disclosure, a method for wireless communications is provided. The method generally includes suspending operation in a first radio access network (RAN) during an idle interval, determining a parameter of a downlink reference signal associated with a second RAN during the idle interval, and powering down at least a portion of hardware for a portion of the idle interval.

In an aspect of the disclosure, an apparatus for wireless communications is provided. The apparatus generally includes means for suspending operation in a first RAN during an idle interval, means for determining a parameter of a downlink reference signal associated with a second RAN during the idle interval, and means for powering down at least a portion of hardware for a portion of the idle interval.

In an aspect of the disclosure, an apparatus for wireless communications is provided. The apparatus generally includes at least one processor and a memory coupled to the at least one processor. The at least one processor is typically configured to suspend operation in a first RAN during an idle interval, to determine a parameter of a downlink reference signal associated with a second RAN during the idle interval, and to power down at least a portion of hardware for a portion of the idle interval.

In an aspect of the disclosure, a computer-program product for wireless communications is provided. The computer-program product generally includes a computer-readable medium having code for suspending operation in a first RAN during an idle interval, determining a parameter of a downlink reference signal associated with a second RAN during the idle interval, and powering down at least a portion of hardware for a portion of the idle interval.

In an aspect of the disclosure, a method for wireless communications is provided. The method generally includes suspending operation in a first RAN during an idle interval, determining a parameter of a downlink reference signal associated with a second RAN during the idle interval, returning to the first RAN after determining the parameter and prior to termination of the idle interval, and transmitting an uplink signal in the first RAN during the idle interval.

In an aspect of the disclosure, an apparatus for wireless communications is provided. The apparatus generally includes means for suspending operation in a first RAN during an idle interval, means for determining a parameter of a downlink reference signal associated with a second RAN during the idle interval, means for returning to the first RAN after determining the parameter and prior to termination of the idle interval, and means for transmitting an uplink signal in the first RAN during the idle interval.

In an aspect of the disclosure, an apparatus for wireless communications is provided. The apparatus generally includes at least one processor, a transmitter, and a memory coupled to the at least one processor. The at least one processor is typically configured to suspend operation in a first RAN during an idle interval, to determine a parameter of a downlink reference signal associated with a second RAN during the idle interval, and to return to the first RAN after determination of the parameter and prior to termination of the idle interval. The transmitter is typically configured to transmit an uplink signal in the first RAN during the idle interval.

In an aspect of the disclosure, a computer-program product for wireless communications is provided. The computer-program product generally includes a computer-readable medium having code for suspending operation in a first RAN during an idle interval, determining a parameter of a downlink reference signal associated with a second RAN during the idle interval, returning to the first RAN after determining the parameter and prior to termination of the idle interval, and transmitting an uplink signal in the first RAN during the idle interval.

In an aspect of the disclosure, a method for wireless communications is provided. The method generally includes signaling a user equipment (UE) of an idle interval in which the UE is to suspend operation in a first RAN and determine a parameter of a downlink reference signal associated with a second RAN, receiving an uplink signal from the UE in the first RAN during the idle interval indicating the UE has completed measurement of the downlink reference signal for the second RAN, and in response to receiving the uplink signal, transmitting a downlink signal to the UE in the first RAN during the idle interval.

In an aspect of the disclosure, an apparatus for wireless communications is provided. The apparatus generally includes means for signaling a UE of an idle interval in which the UE is to suspend operation in a first RAN and determine a parameter of a downlink reference signal associated with a second RAN, means for receiving an uplink signal from the UE in the first RAN during the idle interval indicating the UE has completed determination of the parameter, and means for transmitting, in response to receiving the uplink signal, a downlink signal to the UE in the first RAN during the idle interval.

In an aspect of the disclosure, an apparatus for wireless communications is provided. The apparatus generally includes at least one processor, a receiver, a transmitter, and a memory coupled to the at least one processor. The at least one processor is typically configured to signal a UE of an idle interval in which the UE is to suspend operation in a first RAN and determine a parameter of a downlink reference signal associated with a second RAN. The receiver is typically configured to receive an uplink signal from the UE in the first RAN during the idle interval indicating the UE has completed determination of the parameter. The transmitter is typically configured to transmit, in response to receiving the uplink signal, a downlink signal to the UE in the first RAN during the idle interval.

In an aspect of the disclosure, a computer-program product for wireless communications is provided. The computer-program product generally includes a computer-readable medium having code for signaling a UE of an idle interval in which the UE is to suspend operation in a first RAN and determine a parameter of a downlink reference signal associated with a second RAN, receiving an uplink signal from the UE in the first RAN during the idle interval indicating the UE has completed determination of the parameter, and transmitting, in response to receiving the uplink signal, a downlink signal to the UE in the first RAN during the idle interval.

In an aspect of the disclosure, a method for wireless communications is provided. The method generally includes suspending operation in a first RAN during an idle interval, determining a parameter of a downlink reference signal associated with a second RAN during the idle interval, returning to the first RAN after determining the parameter and prior to termination of the idle interval, and receiving a downlink signal in the first RAN during the idle interval.

In an aspect of the disclosure, an apparatus for wireless communications is provided. The apparatus generally includes means for suspending operation in a first RAN during an idle interval, means for determining a parameter of a downlink reference signal associated with a second RAN during the idle interval, means for returning to the first RAN after determining the parameter and prior to termination of the idle interval, and means for receiving a downlink signal in the first RAN during the idle interval.

In an aspect of the disclosure, an apparatus for wireless communications is provided. The apparatus generally includes at least one processor, a receiver, and a memory coupled to the at least one processor. The at least one processor is typically configured to suspend operation in a first RAN during an idle interval, to determine a parameter of a downlink reference signal associated with a second RAN during the idle interval, and to return to the first RAN after determination of the parameter and prior to termination of the idle interval. The receiver is typically configured to receive a downlink signal in the first RAN during the idle interval.

In an aspect of the disclosure, a computer-program product for wireless communications is provided. The computer-program product generally includes a computer-readable medium having code for suspending operation in a first RAN during an idle interval, determining a parameter of a downlink reference signal associated with a second RAN during the idle interval, returning to the first RAN after determining the parameter and prior to termination of the idle interval, and receiving a downlink signal in the first RAN during the idle interval.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5B is a table of downlink/uplink (DL/UL) subframe configurations for the TDD-LTE frame structure of FIG. 5A in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
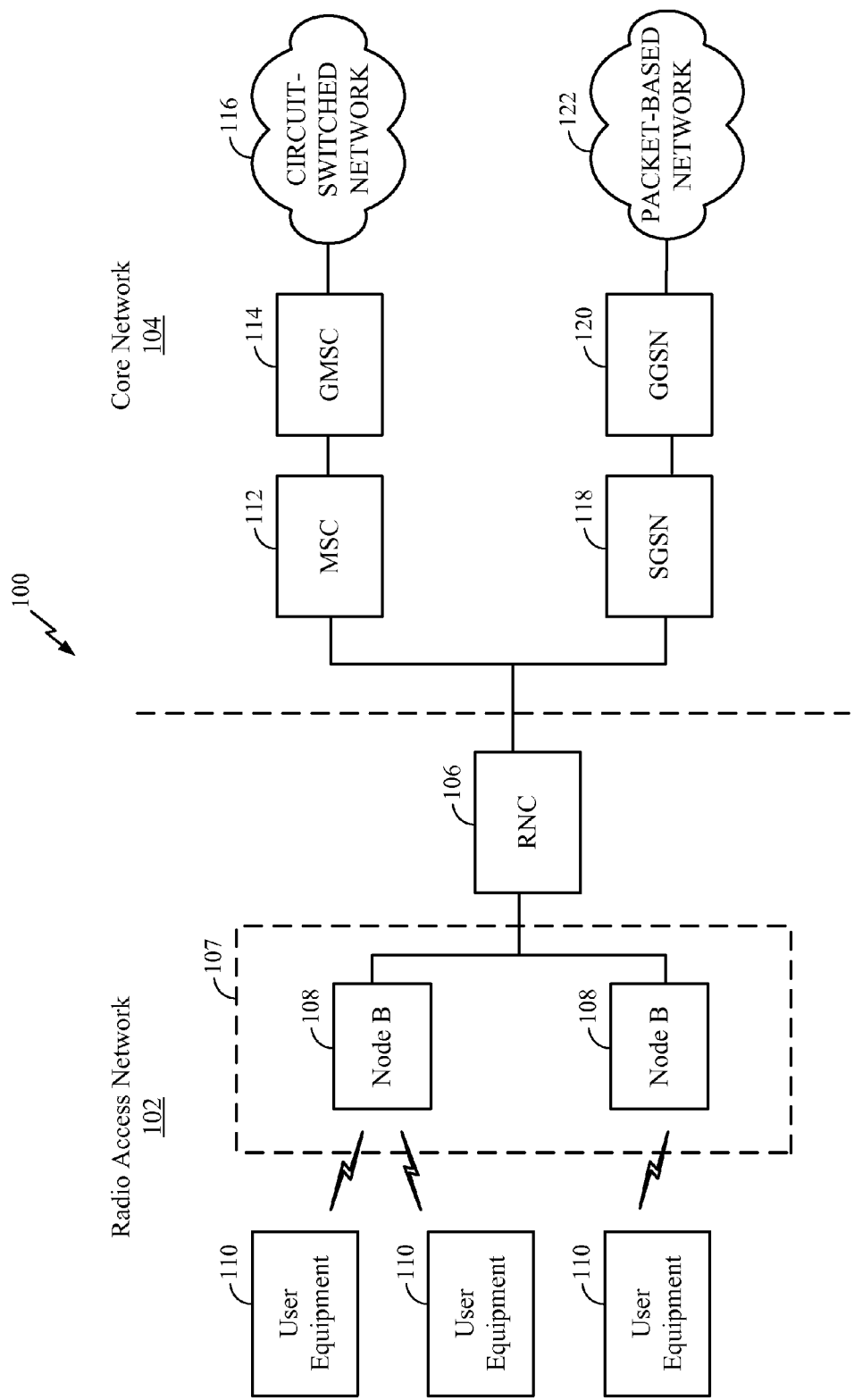
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
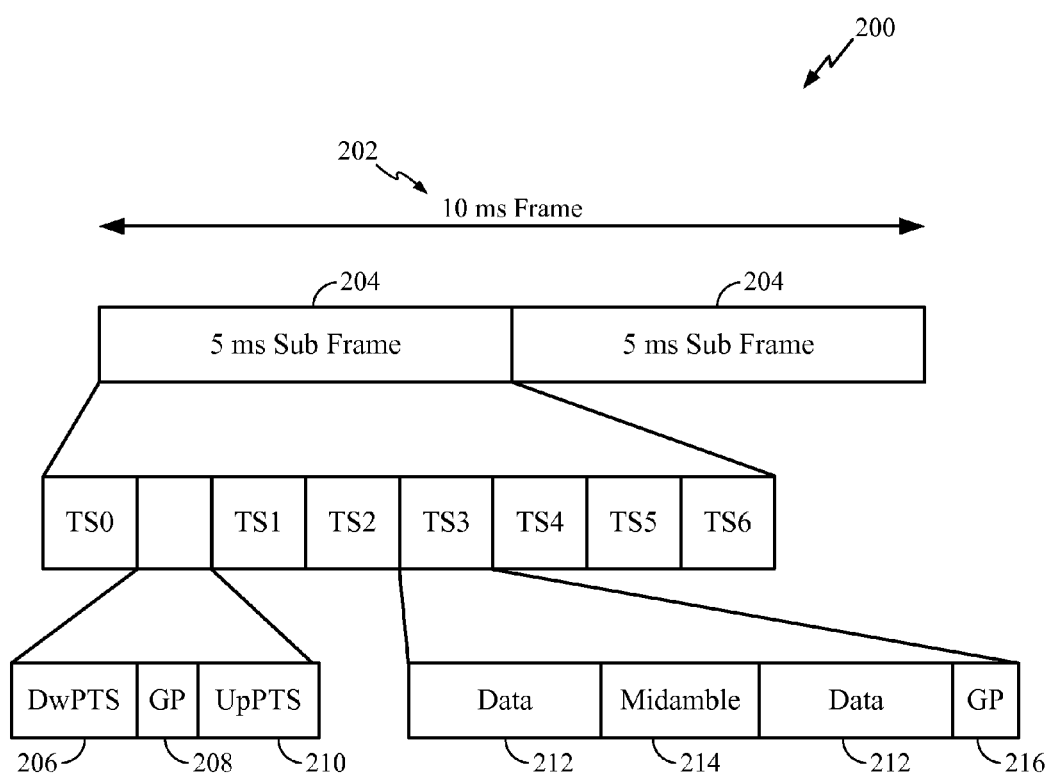
FIG. 2 is a block diagram conceptually illustrating an example of a Time Division Synchronous Code Division Multiple Access (TD-SCDMA) frame structure in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
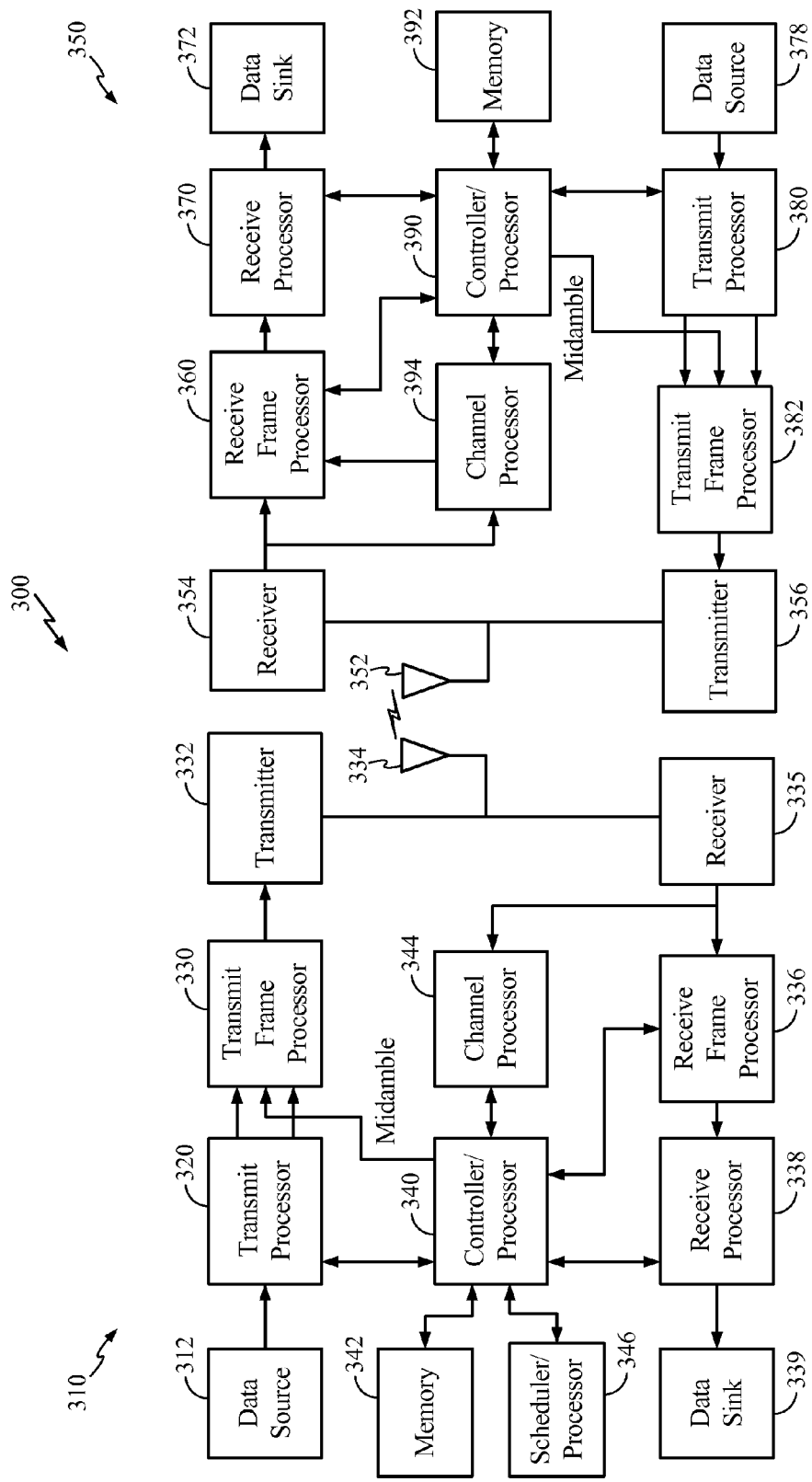
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Example Overlying Radio Access Networks

In order to expand the services available to subscribers, some UEs support communications with multiple radio access technologies (RATs). In deployment of the TD-SCDMA service, the TD-SCDMA network can become a radio access network (RAN) overlaid with other technologies, such as TDD-LTE (Time Division Duplex Long Term Evolution, also known as LTE-TDD or TD-LTE), CDMA 1xRTT (Radio Transmission Technology), Evolution-Data Optimized (EVDO), or Wideband CDMA (WCDMA). A multimode terminal (MMT)—supporting, e.g., TD-SCDMA and TDD-LTE—may register with both networks to provide services.

Figure 4:
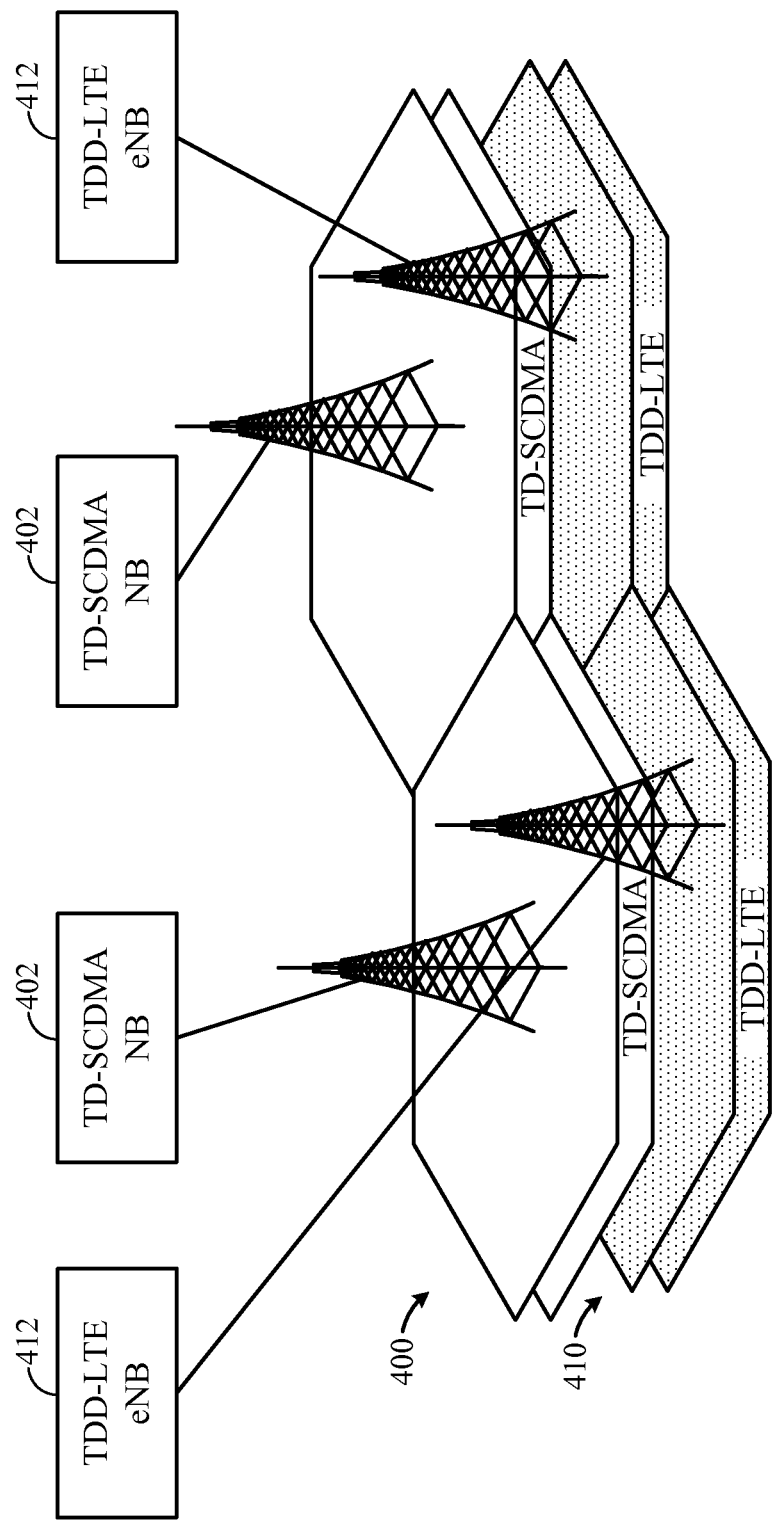
FIG. 4 illustrates an example TD-SCDMA network overlaid on an example Time Division Duplex Long Term Evolution (TDD-LTE) network in accordance with certain aspects of the present disclosure.

FIG. 4 illustrates an example TD-SCDMA network 400 overlaid on an example TDD-LTE network 410. An MMT (not shown) may communicate with either or both networks 400, 410 via TD-SCDMA node Bs (NBs) 402 and/or TDD-LTE evolved node Bs (eNBs) 412. For example, one use case may involve the MMT registering with the TDD-LTE network 410 for data service and with the TD-SCDMA network 400 for voice call service. Another use case may occur when the MMT has two subscriber identity modules (SIMs): one for TDD-LTE and another for TD-SCDMA.

Figure 5A:
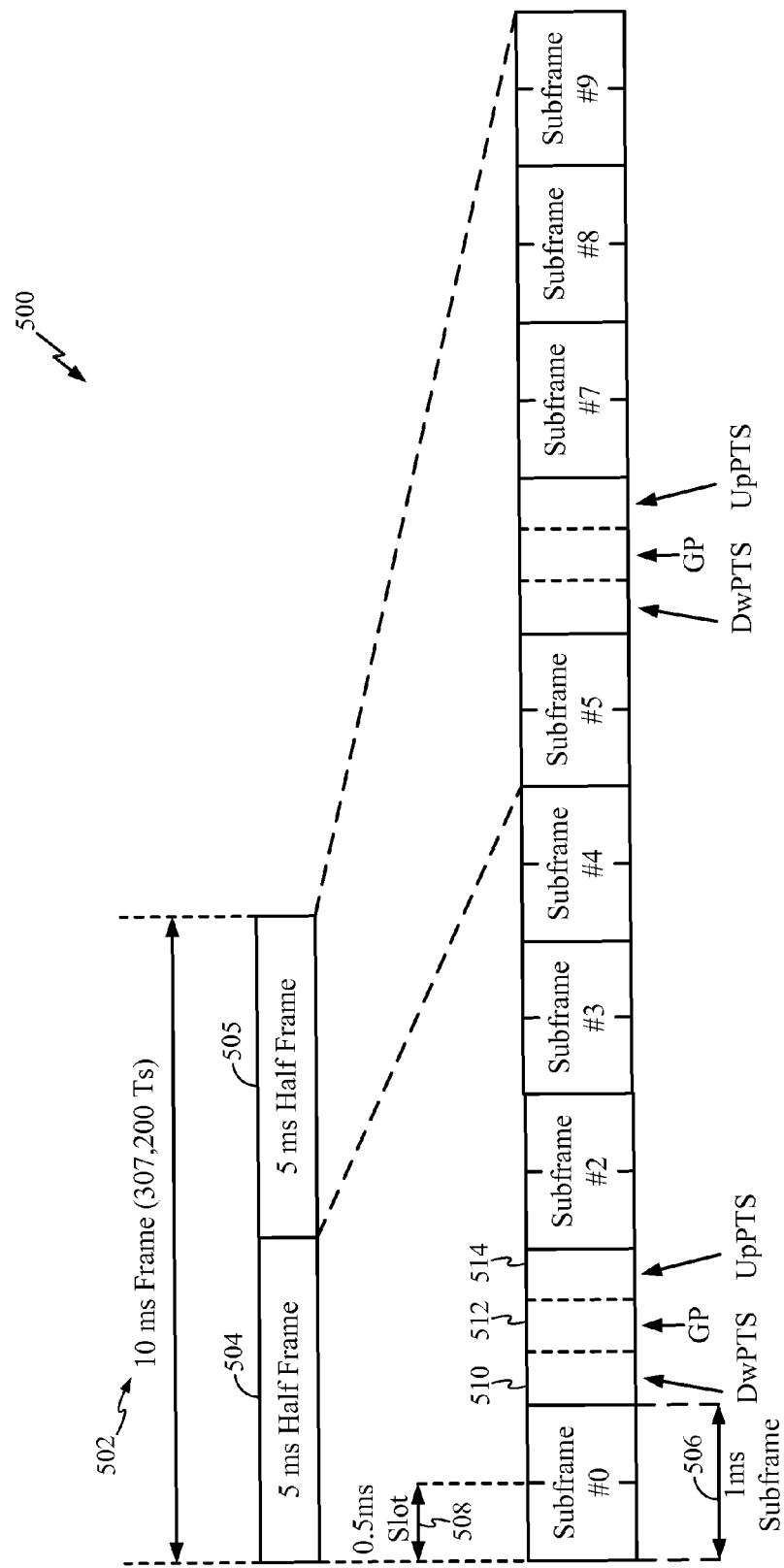
FIG. 5A is a block diagram conceptually illustrating an example of a TDD-LTE frame structure in accordance with certain aspects of the present disclosure.

FIG. 5A shows a frame structure 500 for a Time Division Duplex Long Term Evolution (TDD-LTE) carrier. The TDD-LTE carrier, as illustrated, has a frame 502 that is 10 ms in length. The frame 502 has two 5 ms half frames 504, 505, and each of the half frames 504, 505 includes five 1 ms subframes 506. Each subframe 506 may be a downlink subframe (D), an uplink subframe (U), or a special subframe (S). Downlink subframes and uplink subframes may be divided into two 0.5 ms slots 508. Special subframes may be divided into a downlink pilot time slot (DwPTS) 510, a guard period (GP) 512, and an uplink pilot time slot (UpPTS) 514. Depending on the configuration, the duration of DwPTS, UpPTS, and GP may vary.

FIG. 5B is a table 550 of the downlink/uplink (DL/UL) subframe configurations for the TDD-LTE frame 502 according to the LTE standard. In this table D, U, and S indicate Downlink, Uplink, and Special subframes 506, respectively. The special subframe S may consist of DwPTS 510, GP 512, and UpPTS 514 fields. As illustrated, several UL-DL configurations for 5 ms switch-point periodicity (i.e., two Special subframes per LTE frame 502 spaced 5 ms apart) and 10 ms switch-point periodicity (i.e., one Special subframe per LTE frame 502) may be chosen for a TDD-LTE frame 502. Configurations 0, 1, and 2 have two identical 5 ms half frames 504, 505 within a 10 ms TDD-LTE frame 502. In certain aspects, according to the LTE specification, an evolved node B (eNB) broadcasts the UL-DL configuration and special subframe configuration using a SIB-1 (System Information Block Type 1) message. The SIB-1 is typically transmitted on PDSCH (Physical Downlink Shared Channel) in subframe 5 of every even system frame number (SFN).

An Example Method to Utilize TDD-SCDMA Idle Intervals in TDD-LTE Measurement Operations According to certain aspects, UEs capable of accessing both TD-SCDMA and TDD-LTE networks typically undergo handover (HO) procedures to switch between the two networks. To allow handover of a UE from a TD-SCDMA system to a TDD-LTE system, the TD-SCDMA system may command the UE to measure Reference Signal Receive Power (RSRP) and/or Reference Signal Receive Quality (RSRQ) of reference signals (RSs) received from the TDD-LTE network. The RSRP is an LTE measurement providing a cell-specific signal strength metric. This measurement is mainly used to rank different LTE cells according to their signal strength as an input for handover and cell reselection decisions. The RSRQ is an LTE measurement that offers a cell-specific signal quality metric. Similar to the RSRP, the RSRQ is primarily used to rank different LTE cells according to their signal quality as an input for handover and cell reselection decisions, for example in scenarios for which RSRP measurements do not provide sufficient information to perform reliable mobility decisions.

As discussed above with respect to FIG. 5A, each subframe 506 of a TDD-LTE frame 502 may further be divided into two slots 508, each of 0.5 ms duration. Signals for transmission in each slot 508 may be represented by a two-dimensional time and frequency (i.e., subcarrier) resource grid. The LTE specification defines a resource block (RB) as consisting of 12 consecutive subcarriers for one slot (0.5 ms) in duration. In certain aspects, each slot 508 over one subcarrier may consist of either six or seven OFDM symbols, depending on whether a normal or extended cyclic prefix (CP) is employed. For example, in FIG. 6, each slot 508 over one subcarrier includes seven symbols 602 (numbered 0-6).

To measure the TDD-LTE reference signals, the TD-SCDMA network may provide the UE with an Idle Interval Information IE (information element) in the Measurement Control message of the TD-SCDMA network. The UE may use the TD-SCDMA idle interval to at least temporarily leave the TD-SCDMA network in an effort to perform LTE reference signal (RS) measurements.

Figure 6:
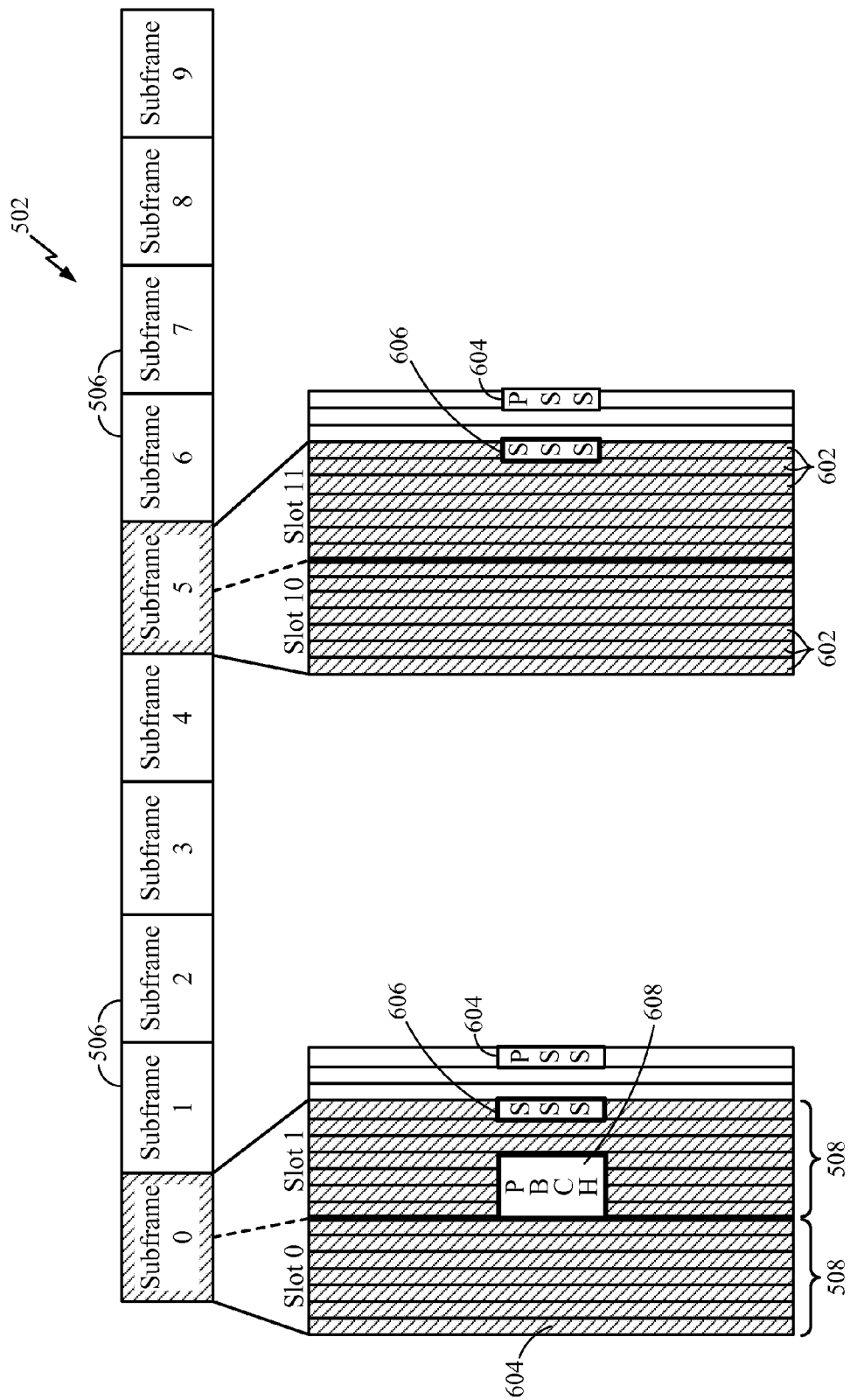
FIG. 6 illustrates the location of various overhead signals in the TDD-LTE frame structure of FIG. 5A in accordance with certain aspects of the present disclosure.

After leaving the TD-SCDMA network, but before measuring the TDD-LTE downlink RSs, the UE may most likely acquire various overhead signals in the TDD-LTE frame as shown in FIG. 6. These overhead signals include the Primary Synchronization Signal (PSS) 604, the Secondary Synchronization Signal (SSS) 606, and the Physical Broadcast Channel (PBCH) 608. The PSS 604 is scheduled for transmission in the third symbol 602 of subframes 1 and 6 and is used to identify the cell index (0, 1, or 2) and subframe timing. The SSS 606 is scheduled for transmission in the last symbol 602 of slots 1 and 11 (where slot 1 is the second slot 508 of subframe 0 and slot 11 is the second slot 508 of subframe 5, such that the TDD-LTE frame 502 has 20 slots (numbered 0-19)). The SSS 606 is used to identify the cell ID group index (0, 1, ..., 167) and frame timing. Used to identify overall downlink transmission bandwidth, the Physical HARQ Indicator Channel (PHICH) configuration, and the TDD-LTE System Frame Number (SFN), the PBCH 608 is scheduled for transmission in slot 1. These overhead signals occupy the center 1.08 MHz (6 RBs) of the transmission bandwidth.

Once these overhead signals are acquired, the UE may perform measurements on the TDD-LTE RSs transmitted using particular slots 508 of the TDD-LTE frame 502. The timing of the TD-SCDMA frames for LTE reference signal measurements during the TD-SCDMA idle interval is typically defined by the TD-SCDMA System Frame Number (SFN) according to the following equation:

$$\text{SFN mod}(2^m) = \text{Offset}$$

In the above equation, parameter m is an index of the TD-SCDMA idle interval period, where m=2, 3, and therefore the idle interval period may be 4 or 8 radio frames. Offset defines an offset within the idle interval period, where Offset=0, 1, ..., 7.

Figure 7:
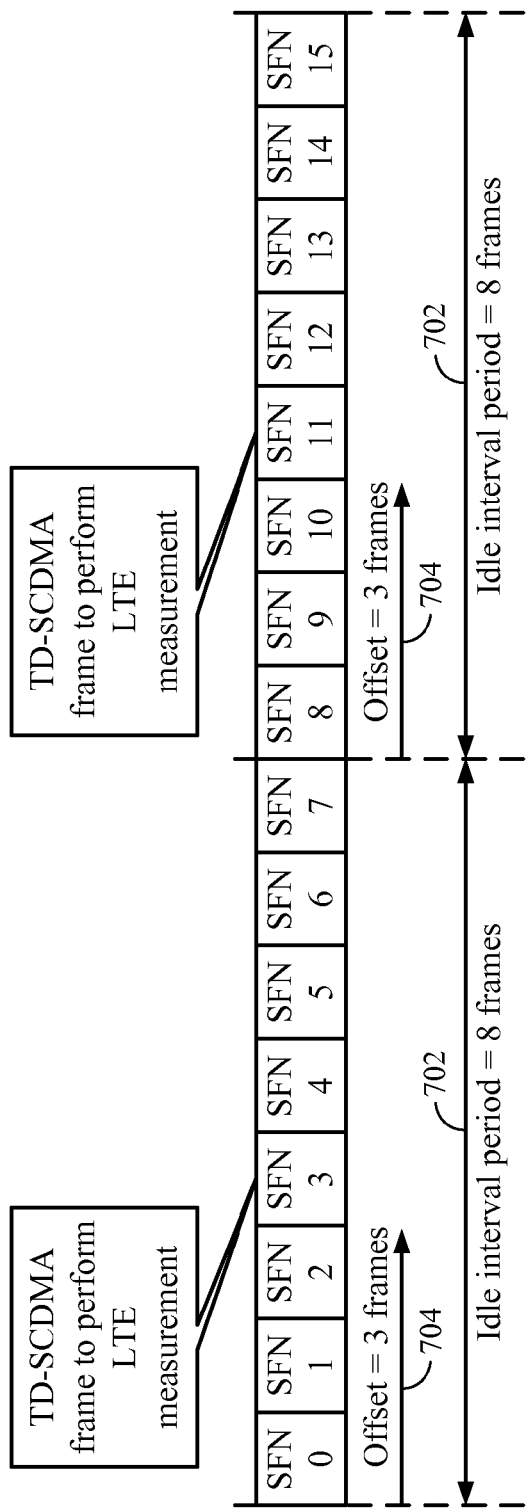
FIG. 7 illustrates periodically performing TDD-LTE measurements during certain TD-SCDMA frames at a particular TD-SCDMA idle interval period in accordance with certain aspects of the present disclosure.

FIG. 7 illustrates particular TD-SCDMA frames in a TD-SCDMA idle interval period during which to perform TDD-LTE reference signal measurements, in accordance with certain aspects of the present disclosure. In the example of FIG. 7, the idle interval period 702 is eight frames (i.e., m=3), and the offset 704 is 3 frames defined within each period 702. Thus, a fourth radio frame within each idle interval period 702 may be used for LTE reference signal measurement, such that SFN 3 and SFN 11 are designated as shown.

However, the acquisition of the overhead signals and measurement of the TDD-LTE reference signals may not take a full 10 ms time interval (i.e., the time length of a TD-SCDMA frame 202 or a TDD-LTE frame 502). This is especially true for a TDD-LTE network 410, which has time-synchronous frame boundaries with a TD-SCDMA network 400. For example, the UE can tune to the TDD-LTE network at the beginning of the 10 ms idle interval, acquire the PSS, SSS, and PBCH, and receive the downlink reference signals from subframes 3 and/or 4 well before completing the measurement cycle of this idle interval. In this case, the remaining duration of the 10 ms idle interval is not used and is wasted time.

Accordingly, what is needed are techniques and apparatus to better utilize the idle interval of TD-SCDMA systems for performing inter-RAT measurements.

Option 1: Power Savings

Figure 8:
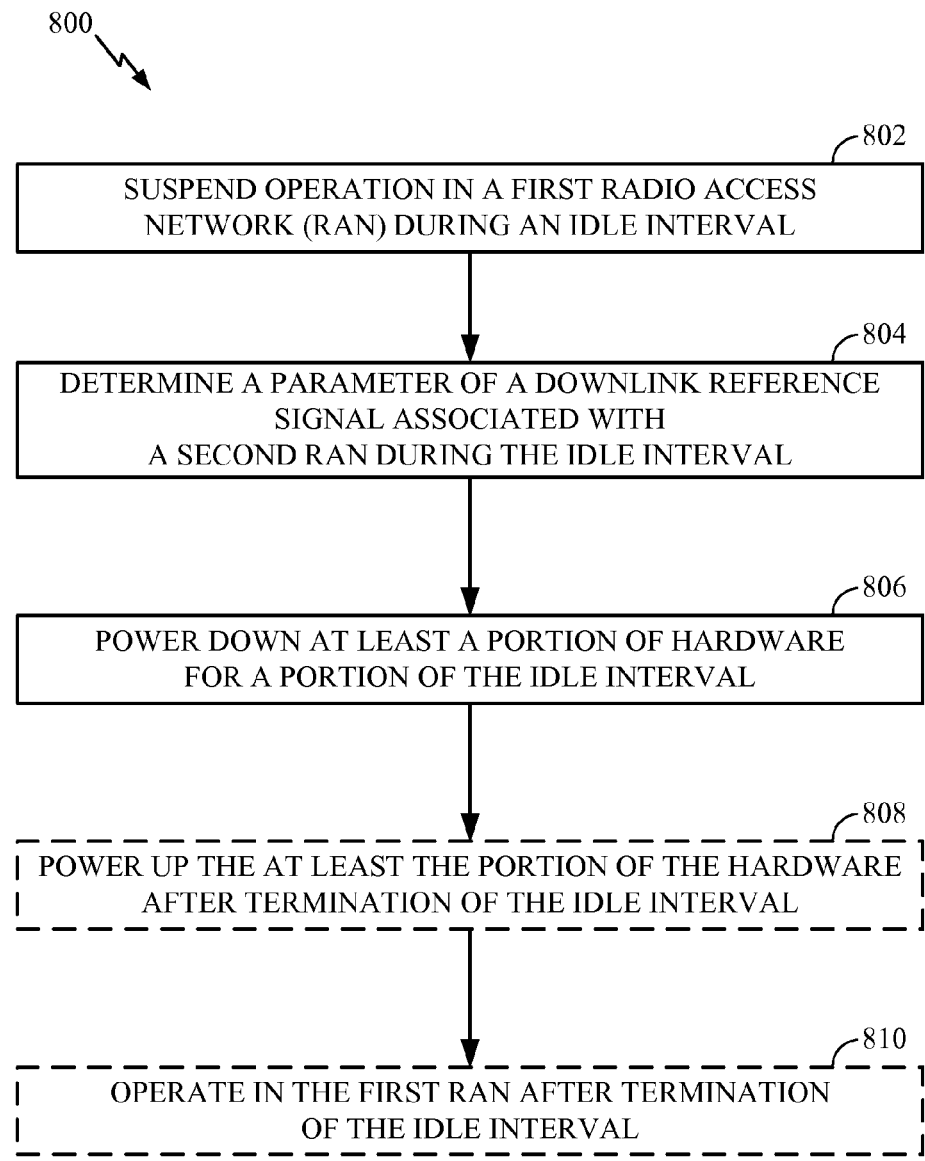
FIG. 8 is a functional block diagram conceptually illustrating example blocks executed to save UE power during an idle interval of a first radio access network (RAN) after performing measurements of a second RAN, in accordance with certain aspects of the present disclosure.

FIG. 8 is a functional block diagram conceptually illustrating example blocks 800 executed to save UE power during an idle interval of a first RAN (e.g., TD-SCDMA) after performing measurements of a second RAN (e.g., TDD-LTE). Operations illustrated by the blocks 800 may be executed, for example, at the processor(s) 370 and/or 390, which may not only perform processing, but may also control other portions of the UE 350 from FIG. 3.

The operations may begin, at 802, by suspending operation in the first RAN during an idle interval (e.g., the 10 ms idle interval during a particular TD-SCDMA frame according to the SFN equation above). As used herein, suspending operation in the first RAN generally refers to the UE ceasing to listen or tune to the first RAN. Such suspension may be accomplished, for example, by not tuning to the bandwidth of the first RAN (i.e., filtering out at least a portion, if not all, of the bandwidth of the first RAN). This tuning may be accomplished by the receiver 354 (and, more specifically, a selectable or tunable bandpass filter in the receiver 354), which may be under the direction of the controller/processor 390 of the UE 350 of FIG. 3. As another example, suspension of operations in the first RAN may also be accomplished by ignoring messages interpreted as being received from the first RAN. Ignoring messages from the first RAN may be performed in the receive frame processor 360, the receive processor 370, and/or the controller/processor 390 of the UE 350 of FIG. 3.

At 804, the UE may determine a parameter of a downlink reference signal associated with the second RAN during the idle interval. For certain aspects, the UE may measure a parameter, such as power, of the received reference signal. The UE may use the measured power, for example, to determine the RSRP or the RSRQ of signals received from a cell in the second RAN as described above.

At 806, the UE may power down at least a portion of hardware in the UE for a portion (e.g., the remaining portion) of the idle interval. For certain aspects, the UE may power down the at least the portion of the hardware after determining the parameter of the downlink reference signal. In this manner, the UE can turn off certain circuitry in an effort to save battery power for the remaining duration of the idle interval, thereby increasing battery life of the UE. For example, the UE may shut down the receiver 354, the receive frame processor 360, the receive processor 370, the channel processor 394, the transmitter 356, the transmit frame processor 382, the transmit processor 380, or any combination thereof during the remaining portion of the idle interval. The controller/processor 390 may control power down (and power up) of the circuitry.

At 808, the UE may power up the at least the portion of the hardware after termination of the idle interval (i.e., after the idle interval has ended). For other aspects, the UE may power up the at least the portion of the hardware during the idle interval, such as near the end of the idle interval. The UE may return to operating in the first RAN at 810 after termination of the idle interval and typically after powering up the at least the portion of the hardware. Operating in the first RAN may include tuning to the bandwidth of the first RAN and/or accepting messages interpreted as being received from the first RAN. For certain aspects, the UE may transmit a request to handover to a cell in the second RAN based on the parameter.

Figure 9:
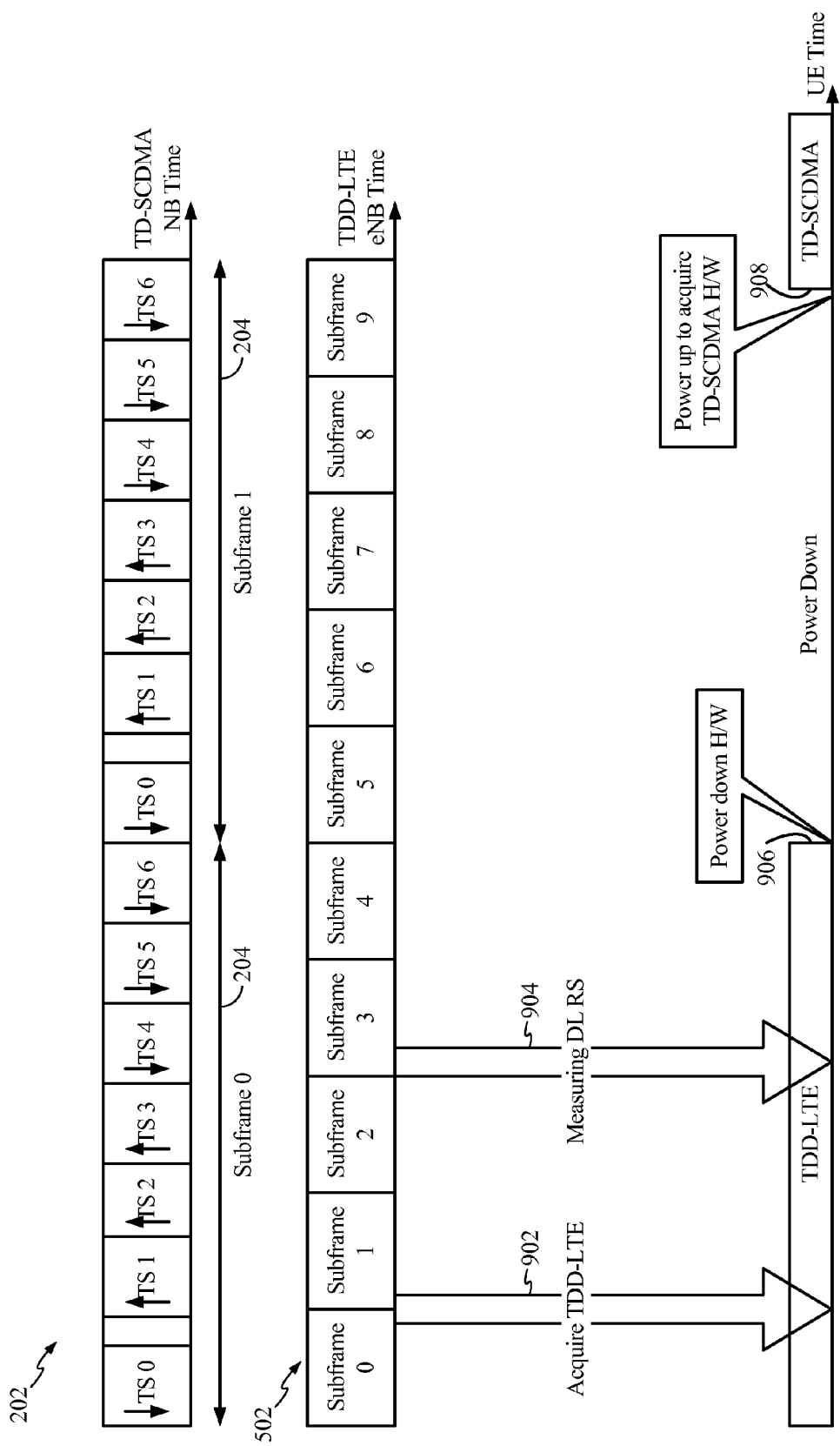
FIG. 9 conceptually illustrates saving UE power during a TD-SCMDA idle interval after performing TDD-LTE measurements during the idle interval, in accordance with certain aspects of the present disclosure.

FIG. 9 illustrates the above concept of saving UE power where the first RAN is a TD-SCDMA network 400 and the second RAN is a TDD-LTE network 410. During a TD-SCDMA idle interval, operations may be, or most likely have already been, suspended in the TD-SCDMA network. During a particular TD-SCDMA frame 202 in the idle interval period 702 based on the TD-SCDMA SFN, the UE may tune to the TDD-LTE network and acquire the various overhead signals (e.g., the PSS, the SSS, and the PBCH) at 902 as described above for learning the subframe timing, for example. These overhead signals may be acquired during subframe 0 and 1 of the TDD-LTE frame 502 as shown in FIG. 6. At 904, the UE may measure the downlink reference signals at subframe 3 and/or 4 of the TDD-LTE frame 502.

Because the frame boundaries of the TD-SCDMA frame 202 are time-aligned with the boundaries of the TDD-LTE frame 502 as shown in FIG. 9, the TDD-LTE network acquisition and measurement of the downlink reference signals may be completed before the end of the first half of the 10 ms TD-SCDMA idle interval (i.e., during TD-SCDMA subframe 0). Therefore, for certain aspects, the UE may power down particular circuitry to conserve power at the end of TDD-LTE subframe 3 or 4 as shown at 906 in FIG. 9.

For certain aspects, the powered down circuitry may be powered up again at 908 at the end of the 10 ms TD-SCDMA idle interval. The UE may then resume operations in the TD-SCDMA network.

Option 2: Increased Throughput

Figure 10:
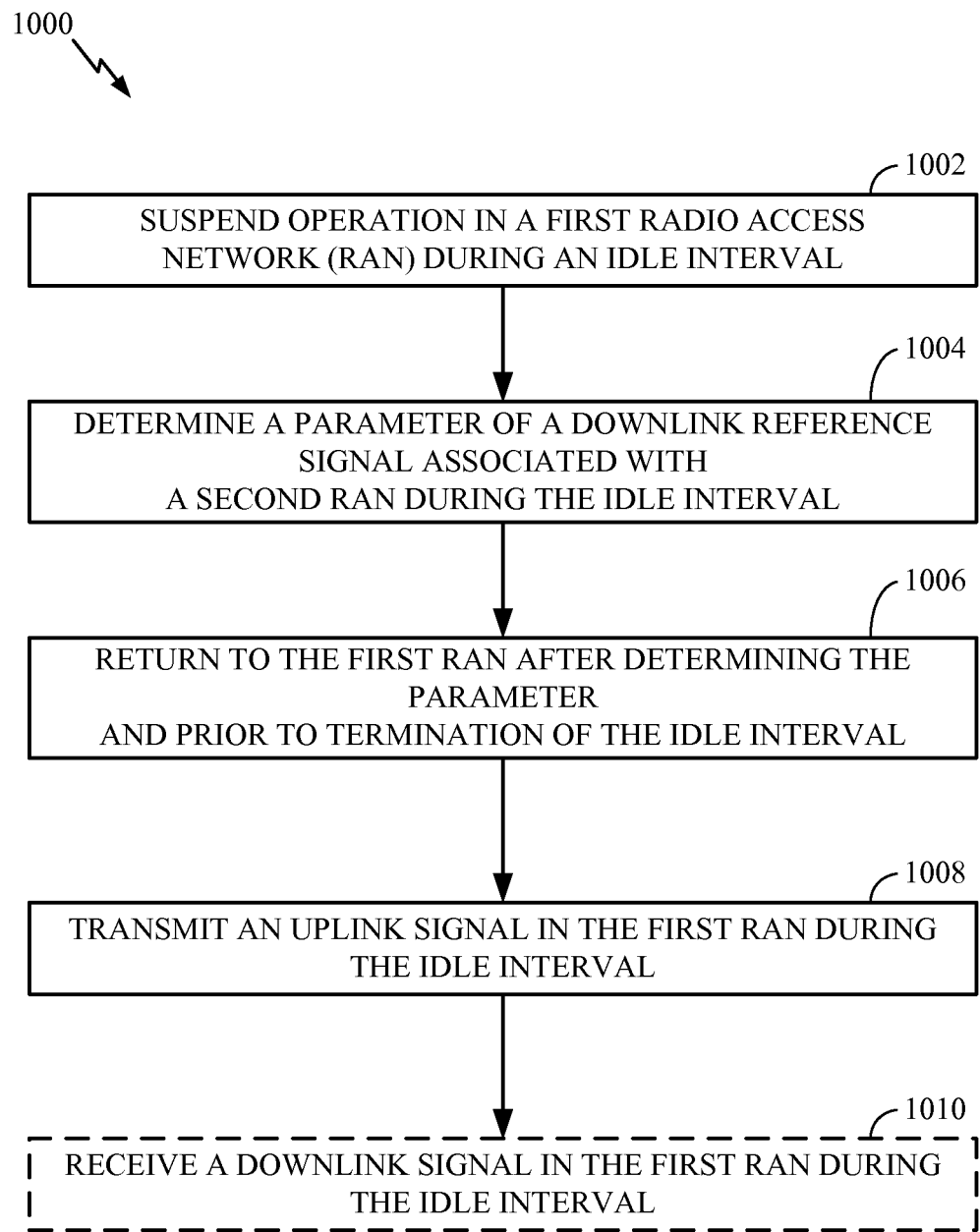
FIG. 10 is a functional block diagram conceptually illustrating example blocks executed to efficiently use an idle interval of a first RAN by transmitting an uplink signal in the first RAN after performing measurements of a second RAN, in accordance with certain aspects of the present disclosure.

FIG. 10 is a functional block diagram conceptually illustrating example blocks 1000 executed to efficiently use an idle interval of a first RAN (e.g., a TD-SCDMA network 400) by transmitting an uplink signal in the first RAN after performing measurements of a second RAN (e.g., a TDD-LTE network 410). Operations illustrated by the blocks 1000 may be executed, for example, at the processor(s) 370 and/or 390, the transmitter 356, and the receiver 354 of the UE 350 from FIG. 3. The operations may begin, at 1002, by suspending operation in the first RAN during an idle interval (e.g., the 10 ms idle interval during a particular TD-SCDMA frame according to the SFN equation above).

At 1004, the UE may determine a parameter of a downlink reference signal associated with the second RAN during the idle interval. For certain aspects, determining the parameter of the downlink reference signal may comprise measuring a parameter, such as the power of the signals received from a cell in the second RAN, and the measured power may be used to determine another parameter of the downlink reference signal, such as the RSRP or the RSRQ as described above.

After determining the parameter of the downlink reference signal, but before termination of the idle interval, the UE may return to operating in the first RAN (e.g., the UE may tune to the first RAN) at 1006. At 1008, the UE may transmit an uplink signal in the first RAN during the idle interval. In this manner, the UE is not sitting idly wasting time (and battery power) during the rest of the idle interval after measuring the reference signal in the second RAN. Rather, the UE has resumed operations in the first RAN while still in the same idle interval during which the parameter of the second RAN's reference signal was determined. For certain aspects, the UE may receive a downlink signal in the first RAN at 1010 during the idle interval. Based on the parameter, the UE may transmit a request to handover to a cell in the second RAN for certain aspects.

Figure 11:
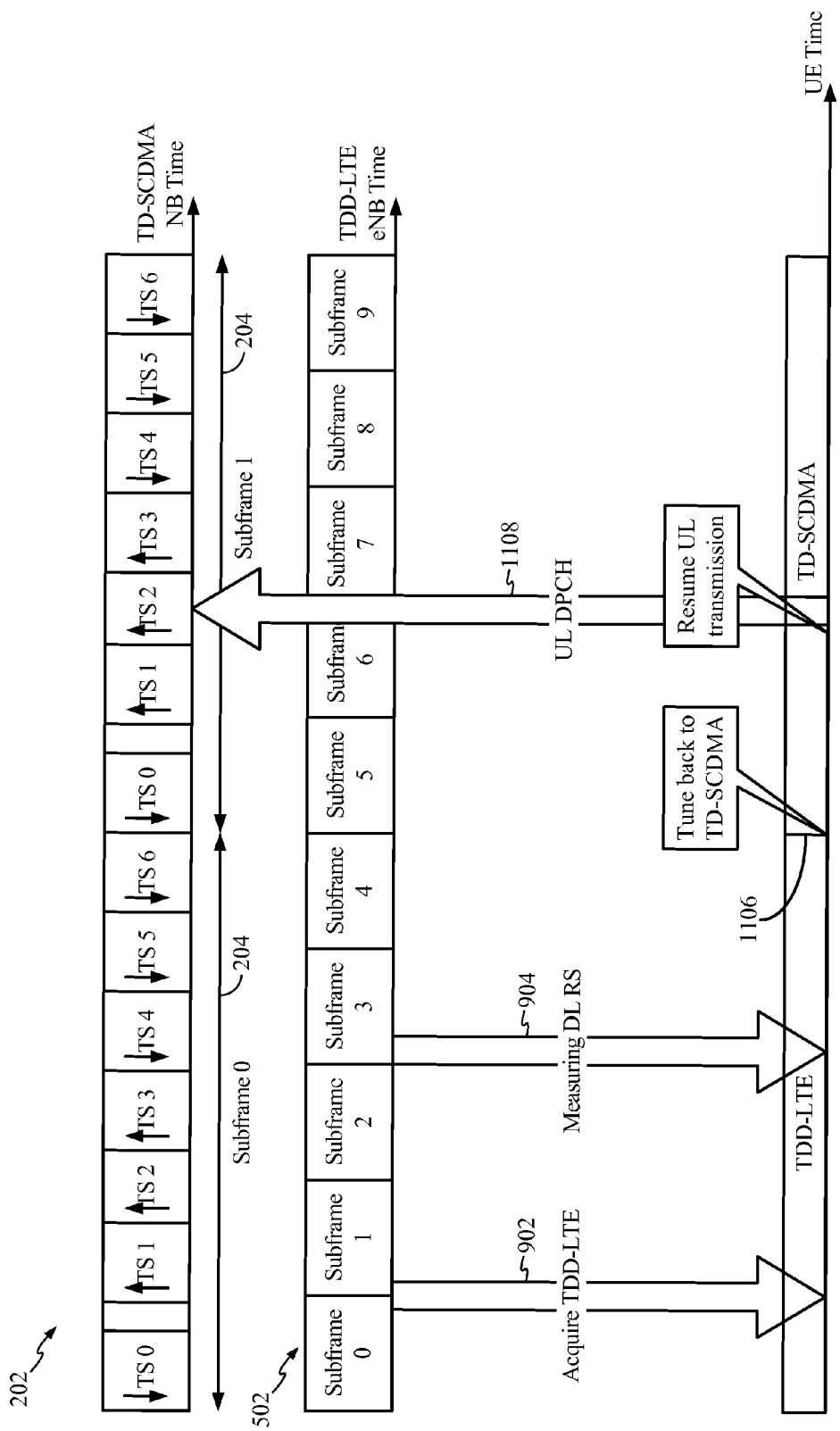
FIG. 11 conceptually illustrates efficiently using a TD-SCMDA idle interval by transmission of a TD-SCDMA uplink signal after TDD-LTE measurements are performed during the idle interval, in accordance with certain aspects of the present disclosure.

FIG. 11 illustrates the above concept of efficiently using an idle interval where the first RAN is a TD-SCDMA network 400 and the second RAN is a TDD-LTE network 410. Similar to FIG. 9, the various overhead signals transmitted from a TDD-LTE eNB 412 may be acquired by the UE at 902, and the TDD-LTE downlink reference signals may be measured by the UE at 904. Rather than powering down particular circuitry as shown at 906 in FIG. 9, the UE may tune back to the TD-SCDMA network at 1106 at the end of TDD-LTE subframe 3 or 4. By tuning back to the TD-SCDMA network, uplink transmission may be resumed during the same idle interval in which the UE measured the TDD-LTE reference signals. For example, the UE may transmit an uplink signal to the TD-SCDMA NB 402 during an uplink time slot (e.g., TS2) via an Uplink Dedicated Physical Channel (UL DPCH) in the TD-SCDMA network at 1108. In this manner, efficiency and throughput may be increased.

Figure 12:
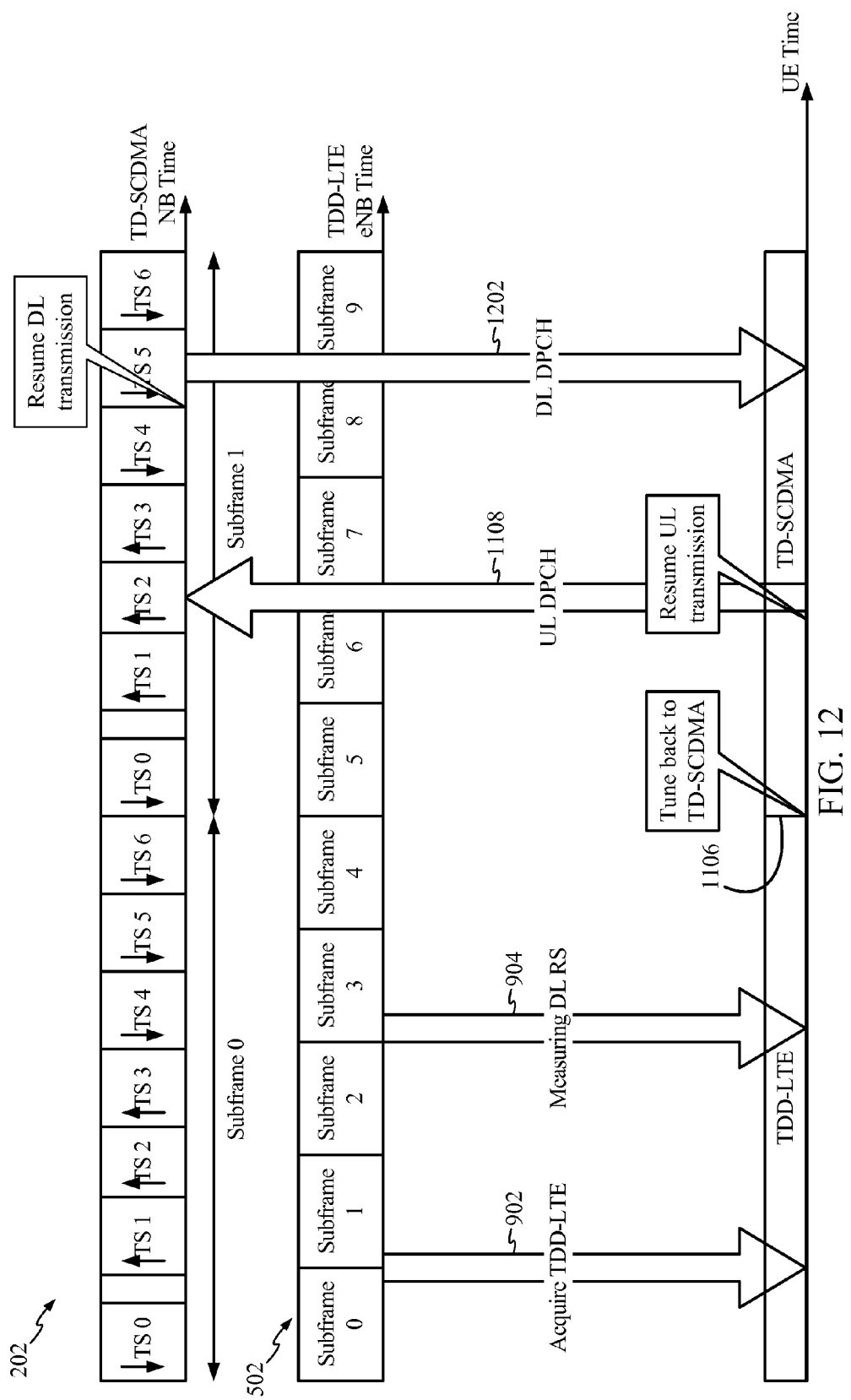
FIG. 12 conceptually illustrates efficiently using a TD-SCMDA idle interval by transmissions of a TD-SCDMA uplink signal and a TD-SCDMA downlink signal after TDD-LTE measurements are performed during the idle interval, in accordance with certain aspects of the present disclosure.
Figure 15:
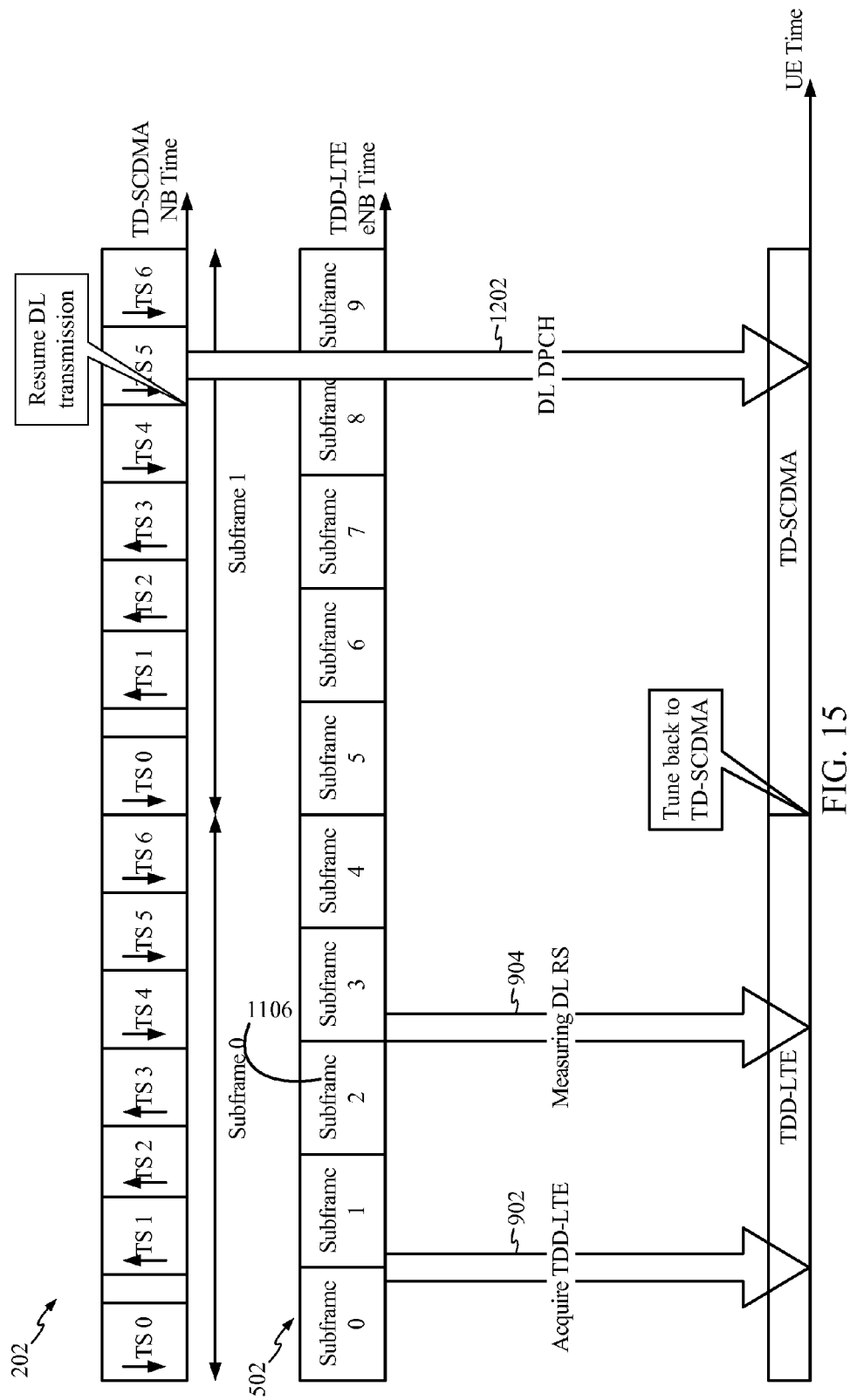
FIG. 15 conceptually illustrates efficiently using a TD-SCMDA idle interval by transmission of a TD-SCDMA downlink signal after TDD-LTE measurements are performed during the idle interval, in accordance with certain aspects of the present disclosure.

For certain aspects as illustrated in FIG. 12, TD-SCDMA downlink transmission may be resumed after tuning back to the TD-SCDMA network at 1106 during the same idle interval in which the UE measured the TDD-LTE reference signals. For example, the TD-SCDMA NB 402 may transmit a downlink signal to the UE during a downlink time slot (e.g., TS5) via a Downlink Dedicated Physical Channel (DL DPCH) in the TD-SCDMA network at 1202. For certain aspects, the TD-SCDMA downlink signal may be transmitted in response to the uplink signal (as illustrated in FIG. 12), while in other aspects, the TD-SCDMA downlink signal may be transmitted irrespective of the uplink signal (as illustrated in FIG. 15).

Figure 13:
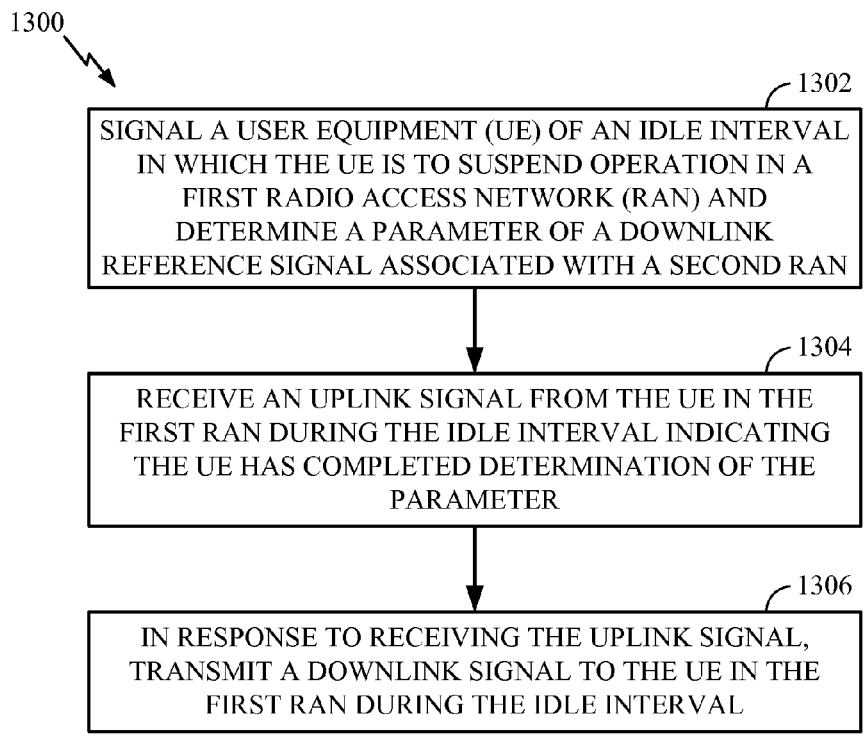
FIG. 13 is a functional block diagram conceptually illustrating example blocks executed to efficiently use an idle interval of a first RAN by receiving an uplink signal in the first RAN indicating that the UE has completed measurements in a second RAN and by transmitting a downlink signal in the first RAN in response, in accordance with certain aspects of the present disclosure.

FIG. 13 is a functional block diagram conceptually illustrating example blocks 1300 executed to efficiently use an idle interval of a first RAN (e.g., a TD-SCDMA network 400) by receiving an uplink signal in the first RAN indicating that the UE has completed measurements in a second RAN (e.g., a TDD-LTE network 410) and by transmitting a downlink signal in the first RAN in response. Operations illustrated by the blocks 1300 may be executed, for example, at the processor(s) 320, 338, and/or 340, the transmitter 332, and the receiver 335 of the Node B 310 from FIG. 3.

The operations may begin, at 1302, by signaling a UE of an idle interval in which the UE is to suspend operation in the first RAN and is to determine a parameter of a downlink reference signal associated with the second RAN. At 1304, the Node B may receive an uplink signal from the UE in the first RAN during the idle interval indicating that the UE has completed determination of the parameter of the downlink reference signal associated with the second RAN. In response to receiving the uplink signal, the Node B may transmit a downlink signal at 1306 to the UE in the first RAN during the idle interval.

Figure 14:
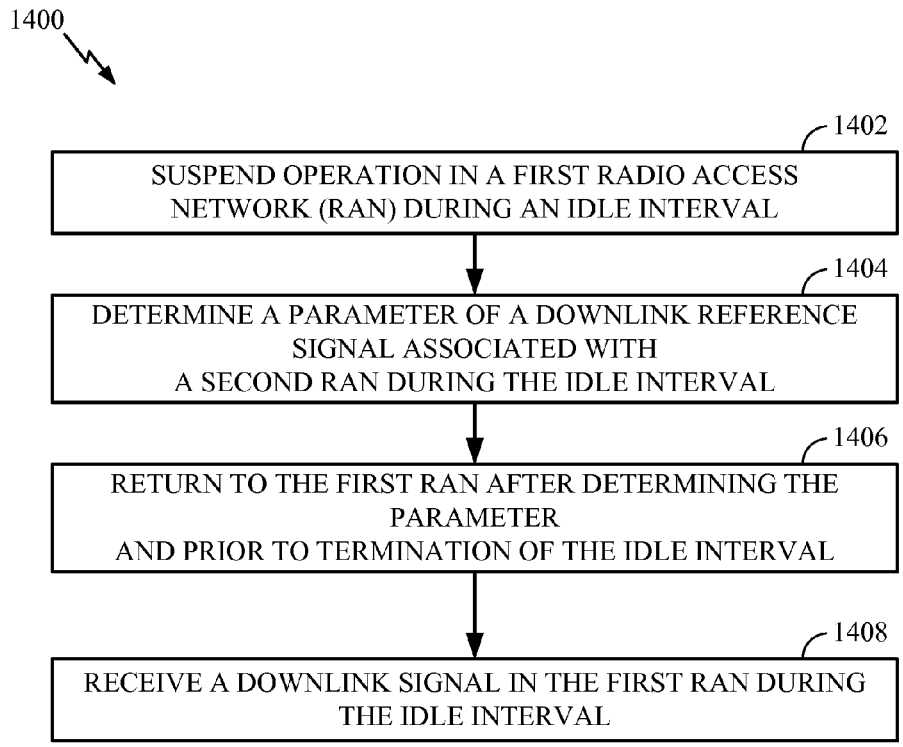
FIG. 14 is a functional block diagram conceptually illustrating example blocks executed to efficiently use an idle interval of a first RAN by receiving a downlink signal in the first RAN after performing measurements of a second RAN, in accordance with certain aspects of the present disclosure.

FIG. 14 is a functional block diagram conceptually illustrating example blocks 1400 executed to efficiently use an idle interval of a first RAN (e.g., a TD-SCDMA network 400) by receiving a downlink signal in the first RAN after performing measurements of a second RAN (e.g., a TDD-LTE network 410). Operations illustrated by the blocks 1400 may be executed, for example, at the processor(s) 370 and/or 390 and the receiver 354 of the UE 350 from FIG. 3. The operations may begin, at 1402, by suspending operation in the first RAN during an idle interval (e.g., the 10 ms idle interval during a particular TD-SCDMA frame 202 according to the SFN equation above).

At 1404, the UE may determine a parameter of a downlink reference signal for the second RAN during the idle interval. For certain aspects, determining the parameter may comprise measuring power of reference signals received from a cell in the second RAN. After determining the parameter of the downlink reference signal, but prior to termination of the idle interval, the UE may return to operating in the first RAN (e.g., the UE may tune to the first RAN) at 1406. At 1408, the UE may receive a downlink signal in the first RAN during the idle interval. In this manner, the UE is not sitting idly wasting time (and battery power) during the rest of the idle interval after measuring the reference signal in the second RAN. Rather, the UE has resumed operations in the first RAN while still in the same idle interval during which the parameter of the second RAN's reference signal was determined. For certain aspects, the UE may transmit a request to handover to a cell in the second RAN based on the parameter.

With certain aspects of the present disclosure, more efficient utilization of the TD-SCDMA idle interval for TDD-LTE measurement operations is achieved. Such efficient TD-SCDMA idle interval operation may provide increased system throughput or may save UE battery power.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
   receiving, from a first radio access network (RAN), an information element indicating an idle interval, the first RAN based on a time division synchronous code division multiple access (TD-SCDMA) radio access technology;
   suspending, at a user equipment (UE), operation in the first RAN during a first portion of the idle interval, the suspending comprises ignoring messages interpreted as being received from the first RAN;
   acquiring synchronization signals from a second RAN during the first portion of the idle interval, the second RAN being based on an time division duplex long term evolution (TDD-LTE) radio access technology and having frame boundaries time-aligned with the first RAN;
   receiving a downlink reference signal and determining a parameter of the downlink reference signal associated with the second RAN during the first portion of the idle interval;
   returning to the first RAN after determining the parameter by accepting messages interpreted as being received from the first RAN during a second portion of the idle interval, the second portion occurring later than the first portion and prior to termination of the idle interval; and
   transmitting an uplink signal in the first RAN during the second portion of idle interval, the uplink signal indicating to the first RAN that the UE has completed measurements in the second RAN.

2. The method of claim 1, further comprising receiving a downlink signal in the first RAN during the second portion of the idle interval.

3. The method of claim 1, wherein the transmitting comprises transmitting the uplink signal via an uplink dedicated physical channel (UL DPCH).

4. The method of claim 1, wherein the idle interval corresponds to a frame period of the first RAN.

5. The method of claim 1, wherein the idle interval is based on a system frame number (SFN).

6. The method of claim 1, wherein the first portion occurs during a first half frame of the second RAN.

7. The method of claim 6, wherein the second portion occurs during a second half frame after the first half frame of the second RAN.

8. The method of claim 1, wherein the determining the parameter comprises measuring a received power of the downlink reference signal.

9. An apparatus for wireless communications, comprising:
    means for receiving, from a first radio access network (RAN), an information element indicating an idle interval, the first RAN based on a time division synchronous code division multiple access (TD-SCDMA) radio access technology;
    means for suspending, at a user equipment (UE), operation in the first RAN during a first portion of the idle interval, the suspending comprises ignoring messages interpreted as being received from the first RAN;
    means acquiring synchronization signals from a second RAN during the first portion of the idle interval, the second RAN being based on an time division duplex long term evolution (TDD-LTE) radio access technology and having frame boundaries time-aligned with the first RAN;
    means for receiving a downlink reference signal and determining a parameter of the downlink reference signal associated with the second RAN during the first portion of the idle interval;
    means for returning to the first RAN after determining the parameter by accepting messages interpreted as being received from the first RAN during a second portion of the idle interval, the second portion occurring later than the first portion and prior to termination of the idle interval; and
    means for transmitting an uplink signal in the first RAN during the second portion of idle interval, the uplink signal indicating to the first RAN that the UE has completed measurements in the second RAN.

10. The apparatus of claim 9, further comprising means for receiving a downlink signal in the first RAN during the second portion of the idle interval.

11. The apparatus of claim 9, wherein the means for transmitting is configured to transmit the uplink signal via an uplink dedicated physical channel (UL DPCH).

12. The apparatus of claim 9, wherein the idle interval corresponds to a frame period of the first RAN.

13. The apparatus of claim 9, wherein the idle interval is based on a system frame number (SFN).

14. The apparatus of claim 9, wherein the first portion occurs during a first half frame of the second RAN.

15. The apparatus of claim 14, wherein the second portion occurs during a second half frame after the first half frame of the second RAN.

16. The apparatus of claim 9, wherein the parameter comprises a received power of the downlink reference signal.

17. An apparatus for wireless communications, comprising: at least one processor configured to:
    receive, from a first radio access network (RAN), an information element indicating an idle interval, the first RAN based on a time division synchronous code division multiple access (TD-SCDMA) radio access technology;
    suspend, at a user equipment (UE), operation in the first RAN during a first portion of the idle interval, the suspending comprises ignoring messages interpreted as being received from the first RAN;
    acquire synchronization signals from a second RAN during the first portion of the idle interval, the second RAN being based on an time division duplex long term evolution (TDD-LTE) radio access technology and having from boundaries time-aligned with the first RAN;
    receive a downlink reference signal and determine a parameter of the downlink reference signal associated with the second RAN during the first portion of the idle interval;
    return to the first RAN after the determining the parameter by accepting messages interpreted as being received from the first RAN during a second portion of the idle interval, the second portion occurring later than the first portion and prior to termination of the idle interval;
    a transmitter configured to transmit an uplink signal in the first RAN during the second portion of idle interval, the uplink signal indicating to the first RAN that the UE has completed measurements in the second RAN; and
    a memory coupled to the at least one processor.

18. The apparatus of claim 17, further comprising a receiver configured to receive a downlink signal in the first RAN during the second portion of the idle interval.

19. The apparatus of claim 17, wherein the transmitter is configured to transmit the uplink signal via an uplink dedicated physical channel (UL DPCH).

20. The apparatus of claim 17, wherein the idle interval corresponds to a frame period of the first RAN.

21. The apparatus of claim 17, wherein the idle interval is based on a system frame number (SFN).

22. The apparatus of claim 17, wherein the first portion occurs during a first half frame of the second RAN.

23. The apparatus of claim 22, wherein the second portion occurs during a second half frame after the first half frame of the second RAN.

24. The apparatus of claim 17, wherein the the parameter comprises a received power of the downlink reference signal.

25. A non-transitory computer-readable medium having non-transitory program code recorded thereon, the non-transitory program code, executable by a processor, comprising code for:
    receiving, from a first radio access network (RAN), an information element indicating an idle interval, the first RAN based on a time division synchronous code division multiple access (TD-SCDMA) radio access technology;
    suspending, at a user equipment (UE), operation in the first RAN during a first portion of the idle interval, the suspending comprises ignoring messages interpreted as being received from the first RAN;
    acquiring synchronization signals from a second RAN during the first portion of the idle interval, the second RAN being based on an time division duplex long term evolution (TDD-LTE) radio access technology and having frame boundaries time-aligned with the first RAN;

receiving a downlink reference signal and determining a parameter of the downlink reference signal associated with the second RAN during the first portion of the idle interval;

returning to the first RAN after determining the parameter by accepting messages interpreted as being received from the first RAN during a second portion of the idle interval, the second portion occurring later than the first portion and prior to termination of the idle interval; and transmitting an uplink signal in the first RAN during the second portion of idle interval, the uplink signal indicating to the first RAN that the UE has completed measurements in the second RAN.

26. The computer-readable medium of claim 25, further comprising code for receiving a downlink signal in the first RAN during the first portion of the idle interval.

27. The computer-readable medium of claim 25, wherein transmitting the uplink signal comprises transmitting the uplink signal via an uplink dedicated physical channel (UL DPCH).

28. The computer-readable medium of claim 25, wherein the idle interval corresponds to a frame period of the first RAN.

29. The computer-readable medium of claim 25, wherein the idle interval is based on a system frame number (SFN).

30. The computer-readable medium of claim 25, wherein the first portion occurs during a first half frame of the second RAN.

31. The computer-readable medium of claim 30, wherein the second portion occurs during a second half frame after the first half frame of the second RAN.

32. The computer-readable medium of claim 25, wherein the determining the parameter comprises measuring a received power of the downlink reference signal.

* * * * *